Patented Mar. 20, 1934

1,951,832

UNITED STATES PATENT OFFICE 1,951,832

ALKYL-2-HYDROXYNAPHTHALENE-3-CARBOXYLIC ACIDS

Wilhelm Luce, Hofheim-on-the-Taunus, and Ernst Fischer, Frankfort-on-the-Main, Germany, assignors to General Aniline Works, Inc., New York, N. Y., a corporation of Delaware No Drawing. Application May 20, 1932, Serial No. 612,630. In Germany May 29, 1931

3 Claims. (Cl. 260—110)

The present invention relates to alkyl-2-hydroxynaphthalene-3-carboxylic acids, more particularly it relates to new compounds of the general formula

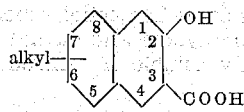

wherein the alkyl radical stands in one of the positions 5, 6, 7 and 8.

The new products are obtainable by causing carbon dioxide to act upon a dry alkali metal salt of an alkylated 2-hydroxynaphthalene, being unsubstituted in the 3-position, of the general formula:

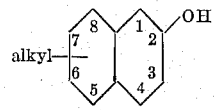

wherein the alkyl radical stands in one of the positions 5, 6, 7 and 8, at an elevated temperature and advantgaeously under superatmospheric pressure.

As starting materials there may be used any alkyl-2-hydroxynaphthalene compound falling within the scope of the above formula, i. e. 2-hydroxynaphthalene containing an alkyl radical in any of the positons 5, 6, 7 and 8. Also other substituents may be present beside the alkyl radical.

The resulting alkyl-2-hydroxynaphthalene-3-carboxylic acids are valuable components for the production of azo dyestuffs or may be used for preparing other intermediate compounds for the manufacture of azo dyestuffs.

The following examples serve to illustrate the invention, but they are not intended to limit it thereto:

(1) 1 mol of 6-methyl-2-hydroxynaphthalene is dissolved in an aqueous solution of 1 mol of sodium hydroxide. The solution is evaporated to dryness, and the sodium salt obtained is carefully dehydrated. The anhydrous salt is treated with carbon dioxide at 250° C. under a pressure of 50 atmospheres until a consumption of carbon dioxide can no longer be detected.

The reaction mixture is dissolved in water; the alkaline solution is neutralized. 6-methyl-2-hydroxynaphthalene separates and is filtered with suction. The filtrate is acidified, and 6-methyl-2-hydroxynaphthalene-3-carboxylic acid, formed by the action of carbon dioxide, separates. It crystallizes from glacial acetic acid in the form of yellow crystals, melting at 233° C.

The new compound is very easily soluble in alcohol, ether, acetone, ethyl acetate already in the cold; it dissolves easily in boiling xylene and glacial acetic acid and somewhat more difficultly in boiling benzene and carbon tetrachloride.

By causing carbon dioxide to act upon a dry alkali metal salt of a methyl-2-hydroxynaphthalene compound which contains the methyl-group in 5- or 7-position, the corresponding 5- or 7-methyl-2-hydroxynaphthalene - 3 - carboxylic acid is formed.

(2) 8-methyl-2-hydroxynaphthalene is transformed into the sodium salt as stated in Example 1. The sodium salt is dehydrated and treated with carbon dioxide at 270° C. under a pressure of 40 atmospheres. The 8-methyl-2-hydroxynaphthalene-3-carboxylic acid formed melts, after recrystallization from glacial acetic acid, at 238° C. It is difficultly soluble in water, easily soluble in alcohol, ether, ethyl acetate, acetone, boiling xylene and glacial acetic acid, more difficultly soluble in benzene and carbon tetrachloride.

(3) 6-ethyl-2-hydroxynaphthalene is transformed into the sodium salt according to Example 1. The anhydrous salt is treated with carbon dioxide at 250° C. under a pressure of 50 atmospheres. There is obtained 6-ethyl-2-hydroxynaphthalene-3-carboxylic acid, melting, after recrystallization from benzene, at 192° C. It is difficultly soluble in water, very easily soluble in ether, alcohol, acetone, ethyl acetate, easily soluble in boiling xylene, benzene and carbon tetrachloride.

By using in this example, instead of 6-ethyl-2-hydroxynaphthalene, 6-propyl-2-hydroxynaphthalene, the 6-propyl-2-hydroxynaphthalene-3-carboxylic acid is obtained, 2-hydroxynaphthalene compounds containing a higher alkyl-group in one of the positions 5, 6, 7 and 8, may also be transformed according to the statements in the examples into the corresponding alkyl-2-hydroxynaphthalene-3-carboxylic acids.

(4) 1 mol of 6-methyl-2-hydroxynaphthalene is dissolved in an aqueous solution of 1 mol of potassium hydroxide; the solution is evaporated to dryness, the potassium salt obtained is dehydrated and treated with carbon dioxide according to Example 1. The carboxylic acid obtained is identical with that obtainable according to Example 1.

(5) 1 part by weight of 6-methyl-2-hydroxynaphthalene is triturated with 5 parts by weight of potassium carbonate and treated at 250° C. with carbon dioxide under a pressure of 50 atmospheres. The carboxylic acid, thus obtained, is identical with that described in Example 1.

(6) 6-methyl-2-hydroxynaphthalene is transformed into the anhydrous sodium salt according to Example 1 and treated at 250° C. with carbon dioxide without applying superatmospheric pressure. The temperature is slowly raised to 280° C. When the absorption of carbon dioxide has ceased, the naphthol formed as by-product is distilled off in a current of carbon dioxide. The residue is worked up as stated in Example 1. The raw mixture of carboxylic acids formed is dried and heated at 200° C. in order to retransform the non-desired 6-methyl-2-hydroxynaphthalene-1-carboxylic acid into 6-methyl-2-hydroxynaphthalene while splitting off carbon dioxide. The mixture of 6-methyl-2-hydroxynaphthalene and 6-methyl-2-hydroxynaphthalene-3-carboxlic acid obtained is dissolved in dilute caustic soda solution and is separated as described in Example 1.

We claim:

1. The compounds of the following general formula:

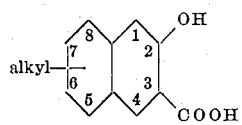

the alkyl radical standing in one of the positions 5, 6, 7 and 8.

2. 6-methyl-2-hydroxynaphthalene-3-carboxylic acid of the formula:

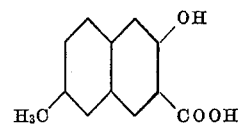

melting at 233° C., being very easily soluble in alcohol, ether, acetone, ethyl acetate already in the cold, easily soluble in boiling xylene and glacial acetic acid and somewhat more difficultly in boiling benzene and carbon tetrachloride.

3. 8-methyl-2-hydroxynaphthalene-3-carboxylic acid of the formula:

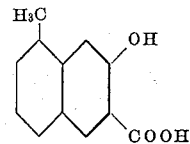

melting at 238° C., being difficultly soluble in water, easily soluble in alcohol, ether, acetic ester, acetone, boiling xylene and glacial ethyl acetate, more difficultly soluble in benzene and carbon tetrachloride.

WILHELM LUCE.
ERNST FISCHER.